US010566604B2

(12) United States Patent
Choi et al.

(10) Patent No.: US 10,566,604 B2
(45) Date of Patent: Feb. 18, 2020

(54) METHOD FOR MANUFACTURING A CURVED ELECTRODE ASSEMBLY (71) Applicant: LG Chem, Ltd., Seoul (KR)

(72) Inventors: Soon-Hyung Choi, Daejeon (KR); Jung-Seok Choi, Daejeon (KR)

(73) Assignee: LG Chem, Ltd. (KR)

(*) Notice: Subject to any disclaimer, the term of this patent is extended or adjusted under 35 U.S.C. 154(b) by 209 days.

(21) Appl. No.: 15/559,972

(22) PCT Filed: Jun. 23, 2016

(86) PCT No.: PCT/KR2016/006643
§ 371 (c)(1),
(2) Date: Sep. 20, 2017

(87) PCT Pub. No.: WO2016/208970
PCT Pub. Date: Dec. 29, 2016

(65) Prior Publication Data
US 2018/0076442 A1 Mar. 15, 2018

(30) Foreign Application Priority Data

Jun. 23, 2015 (KR) .................. 10-2015-0089126

(51) Int. Cl.
*B32B 37/06* (2006.01)
*H01M 4/04* (2006.01)
(Continued)

(52) U.S. Cl.
CPC ....... *H01M 4/0435* (2013.01); *B32B 37/0053* (2013.01); *B32B 37/06* (2013.01);
(Continued)

(58) Field of Classification Search
CPC ... H01M 4/0435; H01M 4/04; B32B 37/0053; B32B 37/06; B32B 37/10
See application file for complete search history.

(56) References Cited

U.S. PATENT DOCUMENTS

2007/0059595 A1 3/2007 Endo et al.
2013/0074711 A1 3/2013 Uematsu et al.
(Continued)

FOREIGN PATENT DOCUMENTS

JP 11307130 A * 11/1999
JP H11307130 A 11/1999
(Continued)

OTHER PUBLICATIONS

Machine Translation of JP-11307130-A (Year: 1999).*
(Continued)

*Primary Examiner* — Daniel McNally
(74) *Attorney, Agent, or Firm* — Lerner, David, Littenberg, Krumholz & Mentlik, LLP (57) ABSTRACT The present disclosure relates to a method for manufacturing an electrode assembly for an electrochemical device. More particularly, the present disclosure relates to a method for manufacturing a curved electrode assembly having a curve with a uniform curvature radius. According to the present disclosure, as the curved electrode assembly is manufactured by stacking a plurality of curved unit cells having a uniform curvature radius, restoration to the original shape is low and shape stability is high as compared to an electrode assembly manufactured by bending a flat electrode assembly. In addition, as unit cells included in an electrode assembly are produced to have a curve by a roll lamination process under a uniform condition and they have the same curvature radius or a small difference in curvature radius, it is possible to easily manufacture an electrode assembly having a desired curvature radius without excessive deformation of the unit cells.

16 Claims, 4 Drawing Sheets (51) Int. Cl.
*H01M 10/04* (2006.01)
*H01M 10/0585* (2010.01)
*B32B 37/00* (2006.01)
*B32B 37/10* (2006.01)

(52) U.S. Cl.
CPC .............. *B32B 37/10* (2013.01); *H01M 4/04* (2013.01); *H01M 4/0471* (2013.01); *H01M 10/04* (2013.01); *H01M 10/0436* (2013.01); *H01M 10/0585* (2013.01); *B32B 2457/10* (2013.01); *H01M 2220/30* (2013.01)

(56) References Cited

U.S. PATENT DOCUMENTS

| | | |
|---|---|---|
| 2014/0093762 A1 | 4/2014 | Goh et al. |
| 2014/0212729 A1 | 7/2014 | Park et al. |
| 2014/0234679 A1* | 8/2014 | Kim ................... H01M 2/1653 429/94 |
| 2015/0010813 A1 | 1/2015 | Ko et al. |
| 2015/0113796 A1 | 4/2015 | Han et al. |

FOREIGN PATENT DOCUMENTS

| | | | |
|---|---|---|---|
| JP | 2008177089 A | * | 7/2008 |
| KR | 20090097731 A | | 9/2009 |
| KR | 20130033977 A | | 4/2013 |
| KR | 20130131246 A | | 12/2013 |
| KR | 20140104888 A | | 8/2014 |
| KR | 20150005470 A | | 1/2015 |
| KR | 20150050319 A | | 5/2015 |

OTHER PUBLICATIONS

Machine Translation of JP-2008177089-A (Year: 2008).*
Search report from International Application No. PCT/KR2016/006643, dated Oct. 5, 2016.

* cited by examiner

METHOD FOR MANUFACTURING A CURVED ELECTRODE ASSEMBLY

CROSS-REFERENCE TO RELATED APPLICATIONS

The present application is a national phase entry under 35 U.S.C. § 371 of International Application No. PCT/KR2016/006643, filed Jun. 23, 2016, published in Korean, which claims priority from Korean Patent Application No. 10-2015-0089126 filed on Jun. 23, 2015, the disclosures of which are incorporated herein by reference.

TECHNICAL FIELD

The present disclosure relates to a method for manufacturing an electrode assembly for an electrochemical device. More particularly, the present disclosure relates to a method for manufacturing a curved electrode assembly having a curve with a uniform curvature radius.

BACKGROUND ART

There is a growing demand for secondary batteries necessary in mobile electronic devices for information communication such as PDA, mobile phones and laptop computers, or electric bike and electric vehicle, and in keeping up with the trend towards compact and lightweight electronic devices, efforts are being made to commercialize secondary batteries that reduce in size and weight, has high energy density, and can be charged and discharged with high capacity.

Secondary batteries in typical shape include, for example, prismatic or pouch-type lithium ion secondary batteries with a small thickness for use in electronic devices such as mobile phones. However, prismatic or pouch-type secondary batteries which are in flat shape fail to efficiently use an internal space, and cannot be adapted for secondary battery applications in various shapes and sizes. Therefore, there is the demand for battery cells and battery packs having a shape that efficiently uses an internal space and has high capacity for applications of electronic devices such as mobile phones in streamlined shape and/or size.

Conventional methods for fabricating a curved battery include a method by which a flat plate-shaped electrode assembly or battery is produced and pressed by a curved jig to fabricate a curved battery.

In relation to this, there are some earlier technologies that form a curve on an electrode assembly. For example, US Patent Publication No. 2007/0059595 discloses a battery in which a jelly-roll type electrode assembly has a curved cross section perpendicular to a winding axis. According to the technology, it is disclosed that the curved shape is achieved through thermal compression molding using a concave heater and a convex heater.

Furthermore, Korean Patent Publication No. 2014-0104888 discloses a method by which a flat battery cell containing an injected electrolyte solution is mounted between a pair of curved jigs and pressed to fabricate a curved battery.

Generally, if a plurality of plate-shaped stack structures is bent to a predetermined of curvature radius together, an amount of deformation in an inner layer stack structure is larger than that of an outer layer stack structure. In contrast, due to the repeated expansion and contraction of active materials coated on a current collector during charge and discharge, a secondary battery cannot maintain its transformed state in a predetermined shape. Thus, a secondary battery with a structure in which a curvature radius is small, namely, a secondary battery with a structure in which warpage is relatively large may tend to restore the warped state to its original state during repeated charge and discharge, and in this case, current collectors are pressed at their ends by a cell case and are subjected to a strong force enough to penetrate a separator, causing a short.

When stress concentrates on a central part of a cell, deformation such as a warpage may occur, and particularly, as the curvature radius reduces, this tendency increases, so the range of shapes that can be fabricated is extremely limitative. In addition, because an electrode plate shrinks and expands during continuous charging and discharging of a battery, there is concern about accelerated shape changes of an electrode assembly. Therefore, there is a need to newly develop a method for manufacturing a curved battery with outstanding shape stability.

DETAILED DESCRIPTION OF THE INVENTION

Technical Problem

The present disclosure is directed to solving the problem of the related art such as the above and the technical problem that has been requested from the past, and specifically, to providing a method for manufacturing a curved electrode assembly with outstanding shape stability. These and other objects and advantages of the present disclosure will be understood from the following description. Also, it will be easily understood that the objects and advantages of the present disclosure may be realized by the means and methods set forth in the appended claims and combinations thereof.

Technical Solution

To achieve the object, there is provided a method for manufacturing a curved electrode assembly.

According to a first embodiment of the present disclosure, the method for manufacturing a curved electrode assembly includes (S1) preparing a stack structure comprising at least one negative electrode, at least one positive electrode, and at least one separator, wherein the negative electrode and the positive electrode are stacked with the separator interposed between to electrically isolate the negative electrode from the positive electrode, and (S2) performing a compression process by which the stack structure is compressed through a pair of compression rollers, to prepare a unit cell, wherein the unit cell obtained through the step (S2) has a curved shape with a curvature radius R.

According to a second embodiment of the present disclosure, in the first embodiment, the method further includes (S3) stacking and compressing at least two unit cells obtained through the (S2).

According to a third embodiment of the present disclosure, in any one of the first and second embodiments, before performing the (S2), the method further includes (S2') setting roll lamination process condition for the unit cell to have a curved shape with a curvature radius R.

According to a fourth embodiment of the present disclosure, in any one of the first through third embodiments, the step (S2) is performed under heating condition.

According to a fifth embodiment of the present disclosure, in any one of the first through fourth embodiments, the compression rollers in the (S2) are provided with a control device to control the set temperature, pressure, and/or rotational speed of the rollers.

According to a sixth embodiment of the present disclosure, in any one of the second through fifth embodiments, the unit cells are obtained through the step (S2) of controlled temperature, pressure, and/or rollers rotational speed.

According to a seventh embodiment of the present disclosure, in any one of the second through sixth embodiments, the step (S3) is performed using a curved jig, and the jig a) a lower jig on which the electrode stack structure is seated and configured to support over the electrode stack structure during thermal compression, and b) an upper jig configured to press down the electrode stack structure, the lower jig and the upper jig having a curvature radius R.

According to an eighth embodiment of the present disclosure, in the seventh embodiment, the upper jig and the lower jig are bent in a same direction such that the upper jig is superimposed on the lower jig during compression.

Also, a ninth embodiment of the present disclosure relates to a method for manufacturing a curved electrode assembly by stacking a plurality of unit cells having a curvature radius R. In the ninth embodiment, a maximum difference in curvature radius representing a curvature radius difference between a unit cell having a longest curvature radius (R1) and a unit cell having a shortest curvature radius (R2) among the unit cells is within 10%.

According to a tenth embodiment of the present disclosure, in the ninth embodiment, the maximum difference in curvature radius is calculated through the following Equation 2:

$$\text{Maximum difference of curvature radius} = \frac{\text{Longest curvature radius } (R1) - \text{Shortest curvature radius } (R2)}{\text{Longest curvature radius } (R1)} \times 100 \quad [\text{Equation 2}]$$

Lastly, according to an eleventh embodiment of the present disclosure, in the ninth or tenth embodiment, the unit cell is prepared by making curved to have a preset curvature radius R by a roll lamination process.

Effect of the Invention

According to the present disclosure, as a curved electrode assembly is manufactured by stacking a plurality of curved unit cells having a uniform curvature radius R, restoration to the original shape is low and shape stability is high as compared to an electrode assembly manufactured by bending a flat electrode assembly. In addition, as unit cells included in an electrode assembly are produced to have a curve by a roll lamination process under a uniform condition and they have the same curvature radius R or a small difference in curvature radius R, it is possible to easily manufacture an electrode assembly having a desired curvature radius R without excessive deformation of the unit cells.

BRIEF DESCRIPTION OF THE DRAWINGS

The accompanying drawings illustrate a preferred embodiment of the present disclosure, and together with the detailed description, serve to provide further understanding of the principle of the present disclosure, and thus, the present disclosure is not construed as being limited thereto. On the other hand, the shape, size, scale or proportion of elements in the drawings may be exaggerated for clarity.

MODE FOR CARRYING OUT THE INVENTION

Hereinafter, the present disclosure will be described in detail with reference to the accompanying drawings. It should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the embodiments described herein and illustrations shown in the drawings are just a most preferred embodiment of the present disclosure and do not represent all the technical aspects of the present disclosure, so it should be understood that substitution of various equivalents and modifications could be made at the time a patent application was filed.

The present disclosure provides a method for manufacturing a curved electrode assembly that is bent to have a curvature radius R. The manufacturing method is characterized in that curved unit cells having a preset curvature radius R are manufactured and at least two of them are stacked to manufacture a curved electrode assembly having the curvature radius R. The electrode assembly manufactured by the manufacturing method of the present disclosure has so good shape stability that it maintains a curved shape.

Figure 1:
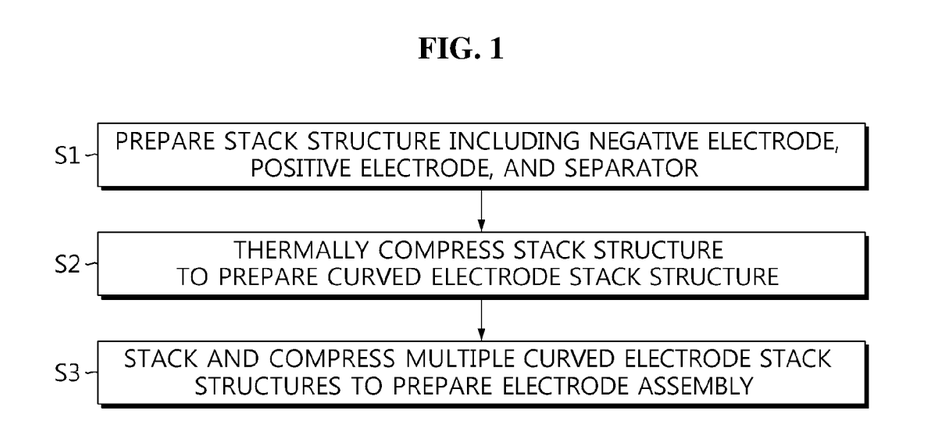
FIG. 1 is a process flowchart of a method for manufacturing an electrode assembly according to a particular embodiment of the present disclosure.

FIG. 1 is a process flowchart showing the method for manufacturing a curved electrode assembly according to the present disclosure. Referring to FIG. 1, the method for manufacturing a curved electrode assembly according to the present disclosure includes the following steps (S1) to (S3):

(S1) preparing a stack structure including a negative electrode, a positive electrode and a separator;

(S2) compressing the stack structure to prepare a unit cell; and (S3) stacking and compressing at least two unit cells obtained through the (S2).

According to a particular embodiment of the present disclosure, the stack structure may include at least one negative electrode, at least one positive electrode and at least one separator, and the negative electrode and the positive electrode are stacked such that electrical isolation is maintained by the separator.

In a particular embodiment of the present disclosure, the step (S2) may be performed using a compression member provided with a pair of rollers. The compression member may be, for example, a roll lamination device. The stack structure is compressed while passing through between the pair of rollers of the roll lamination device, into a unit cell in which the negative electrode, the positive electrode and the separator are bound together. The compression according to a particular embodiment of the present disclosure may be performed under heating condition.

In the present disclosure, the method for manufacturing a curved electrode assembly presets a curvature radius R that will be applied to the unit cells and controls the process condition for the unit cells to have the preset curvature radius R. For example, by controlling the temperature condition, the pressure condition, and/or the rotational speed of the rollers in the compression process, the unit cells may have a curve with the preset curvature radius R when bent. According to a particular embodiment of the present disclosure, the curve may be in the arc shape of a circle or an oval.

By mounting the unit cell itself in a battery case having a predetermined curved shape, a curved battery may be manufactured. Alternatively, according to another aspect of the present disclosure, by stacking at least two unit cells, a curved electrode assembly having the predetermined curvature radius R may be manufactured.

In the present disclosure, the positive electrode may include a positive electrode current collector made of, for example, aluminum (Al) and a positive electrode active material layer formed by coating a positive electrode active material on one surface or both surfaces of the positive electrode current collector. Similarly, the negative electrode may include a current collector made of copper and a negative electrode active material layer formed by coating a negative electrode active material on one surface of the current collector.

The positive electrode active material includes, for example, a layered positive electrode active material such as $LiCoO_2$, $LiNiO_2$, $LiNi_{1-y}Co_yO_2$ ($0<y<1$), $LiMO_2$ (M=Mn, Fe), $Li(Ni_aCo_bMn_c)O_2$ ($0<a<1$, $0<b<1$, $0<c<1$, $a+b+c=1$), $LiNi_{1-y}Mn_yO_2$($0≤y<1$); a spinel-type positive electrode active material such as $LiMn_2O_4$, $LiMn_{2-z}Co_zO_4$ ($0<z<2$), $LiMn_{2-z}Ni_zO_4$ ($0<z<2$), $Li(Ni_aCo_bMn_c)O_4$ ($0<a<2$, $0<b<2$, $0<c<2$, $a+b+c=2$); and an olivine-type positive electrode active material such as $LiCoPO_4$, $LiFePO_4$.

Also, the negative electrode active material includes, for example, a carbon-based material such as petroleum coke, activated carbon, graphite, non-graphitizable carbon, graphite-based carbon; metal composite oxide such as $Li_xFe_2O_3$ ($0≤x≤1$), $Li_xWO_2$ ($0≤x≤1$), $Sn_xMe_{1-x}Me'_yO_z$ (Me: Mn, Fe, Pb, Ge; Me': Al, B, P, Si, elements in Groups 1, 2 and 3 of the periodic table, halogen; $0<x≤1$; $1≤y≤3$; $1≤z≤8$); lithium metals; lithium alloys; silicon-based alloys; tin-based alloys; oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$; conductive polymers such as polyacetylene; and Li—Co—Ni based materials.

In the present disclosure, each of the negative electrode and the positive electrode may have an electrode tab such as a negative electrode tab or positive electrode tab. For example, the electrode tab may be integrally formed with the negative electrode current collector and/or positive electrode current collector, and correspond to a non-coating region which is not coated with an electrode active material. That is, the electrode tab (T) may be formed by cutting a region corresponding to a region un-coated with an electrode active material on the surface of the current collector into an optimum shape.

In a particular embodiment of the present disclosure, the separator acts as an ion conducting barrier that allows ions to pass through while blocking an electrical contact between the negative electrode and the positive electrode. According to a particular embodiment of the present disclosure, the separator may include a porous polymer substrate having a plurality of micropores. Further, the separator may have a porous coating layer on the surface of the porous polymer substrate, and the porous coating layer includes a plurality of inorganic particles and polymer binder resin. The porous coating layer is a layer in which the inorganic particles are densely packed by point-binding and/or surface-binding through the medium of the binder resin within the coating layer, and the coating layer has a porous structure resulting from interstitial volumes between the inorganic particles.

The porous polymer substrate is a porous polymer substrate formed of at least one of polymer resins including, but not limited to, for example, polyolefin, polyethyleneterephthalate, polybutyleneterephthalate, polyacetal, polyamide, polycarbonate, polyimide, polyetheretherketone, polyethersulfone, polyphenyleneoxide, polyphenylenesulfide, polyethylenenaphthalene. Also, the porous polymer substrate includes a sheet-type film formed by melting the polymer resin, and a nonwoven fabric produced by putting together filaments obtained by melt-spinning the polymer resin. Preferably, the porous polymer substrate is a porous polymer substrate produced by melting/molding the polymer resin into a sheet shape.

Subsequently, a particular embodiment of the present disclosure is described with reference to the accompanying drawings.

Figure 2:
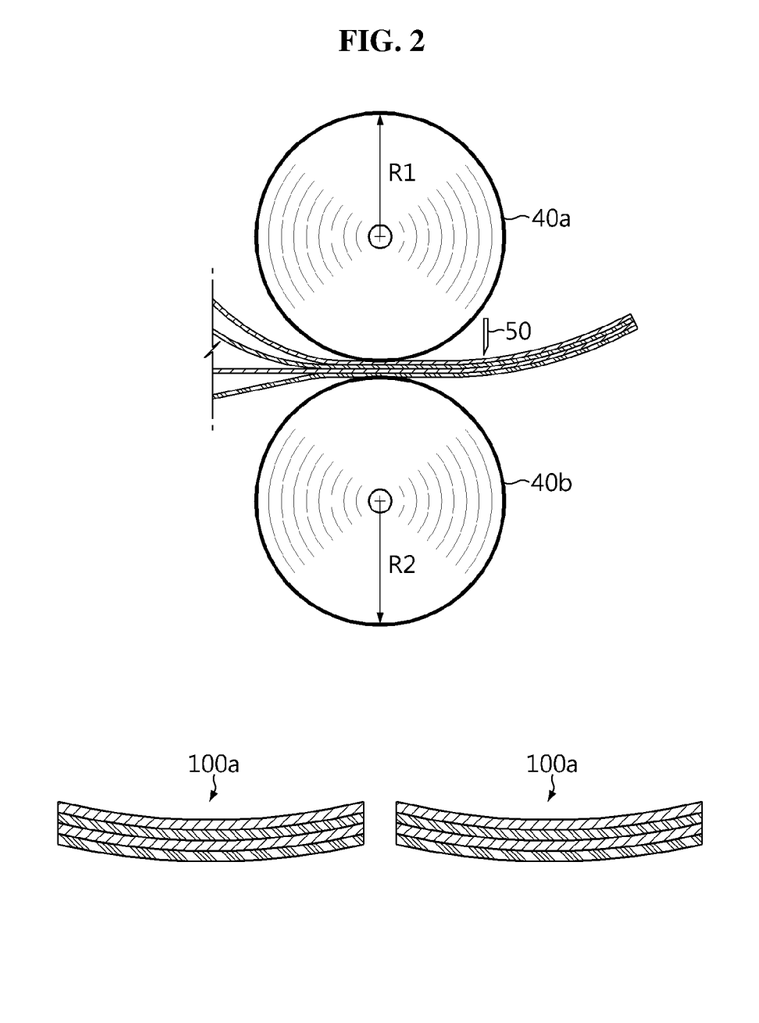
FIG. 2 is an illustration of a process of manufacturing a unit cell according to a particular embodiment of the present disclosure.

FIG. 2 is an illustration of a method for manufacturing a curved unit cell using a roll lamination device. Referring to FIG. 2, a negative electrode, a positive electrode and a separator are stacked in a sequential order and consecutively supplied to a roll lamination device (S1), and as they pass through rollers, are compressed to manufacture a unit cell in which the negative electrode, the positive electrode and the separator are bound together (S2). The unit cell having passed through the rollers is cut into an optimum size by a cutter 50, and is made ready for use.

According to a particular embodiment of the present disclosure, as the unit cell is compressed by roll lamination, the unit cell is bent and curved along the travel direction of the rollers to form a curve with the predetermined curvature radius R.

In the present disclosure, as the unit cell(s) has a layered structure and the negative electrode, the positive electrode, and the separator that form each layer includes different materials, the extent at which each layer reacts, for example, shrinks or elongates changes depending on the process condition such as the temperature, the pressure and/or the rotational speed of the rollers applied during roll compression. Thus, the optimum control of this process condition makes it possible to manufacture the unit cell having the predetermined curvature radius R.

Conventionally, a curved electrode assembly or battery was manufactured by pressing a flat plate-shaped electrode assembly or battery using a curved jig. However, as described previously, in this case, stress concentrates on a central part of cell, causing deformation such as a warpage, or a problem with failure to return to the original state, namely, the flat state, by the shape recovery capability.

As opposed to the conventional method for manufacturing a curved electrode assembly, the present disclosure employed a method which controls the roll lamination process condition so that a unit cell can stably maintain a curved shape having a uniform curvature radius R. According to a particular embodiment of the present disclosure, before performing the roll lamination process, the process condition is set for a unit cell to have a desired curvature radius R, and then a unit cell is manufactured according to the process condition being set. A plurality of unit cells manufactured under the same roll lamination process condition has a same curvature radius R, or curvature radii R with a small difference according to circumstances. Thus, the unit cells are appropriately stacked to manufacture a curved electrode assembly having the predetermined curvature radius R. Because it was produced by stacking the curved unit cells, the finally produced curved electrode assembly stably maintains the curved shape and eliminates the possibility of shape deformation, as compared to the curved electrode assembly according to the conventional manufacturing method.

According to a particular embodiment of the present disclosure, the roll lamination may be performed under heating condition, and the heating temperature may be appropriately controlled based on the desired curvature radius R or curvature.

According to a particular embodiment of the present disclosure, before performing the step (S2), the method may further include the step (S2') for appropriately setting the detailed condition of the roll lamination process, for example, the heating condition, the pressure condition, and/or the rotational speed of the rollers to form the desired curvature radius R in the unit cell.

For the subsequent process, a plurality of unit structures having a same curvature radius or a curvature radius that falls within a predetermined range may be manufactured through the step (S2). In this stance, for the plurality of manufactured unit cells to maintain a uniform curvature, that is, to have a same curvature radius R or a curvature radius R included within a predetermined tolerance range, it is preferable to uniformly maintain the process condition of roll lamination until a desired number of unit cells is obtained. To this end, the rollers may be provided with a control device to control the process conditions individually or simultaneously, such as the temperature, the pressure, and/or the rotational speed of rollers.

According to a particular embodiment of the present disclosure, an axis of the curve in the curve of the unit cell may be formed parallel to the travel direction (MD) of the rollers. Also, the shape of the curved unit cell is a curve in the arc shape of a circle or an oval, where both end parts of the unit cell are bent in a same direction, that is, two are bent upwards or downwards with respect to the plane.

According to a particular embodiment of the present disclosure, the unit cell may be a bicell with topmost and bottommost electrode layers of the same polarity, or a full cell with an electrode having topmost and bottommost electrode layers of different polarities. Also, the separator may be displaced at the topmost and/or topmost of the unit cell.

In a particular embodiment of the present disclosure, the curve which is bent in the unit cell may be in the shape of an arc which is a segment of a circle or an oval. In the case of the oval shape, the curvature radius at a central part of the curve may be larger or smaller than the curvature radius at an end part of the curve.

Figure 3:
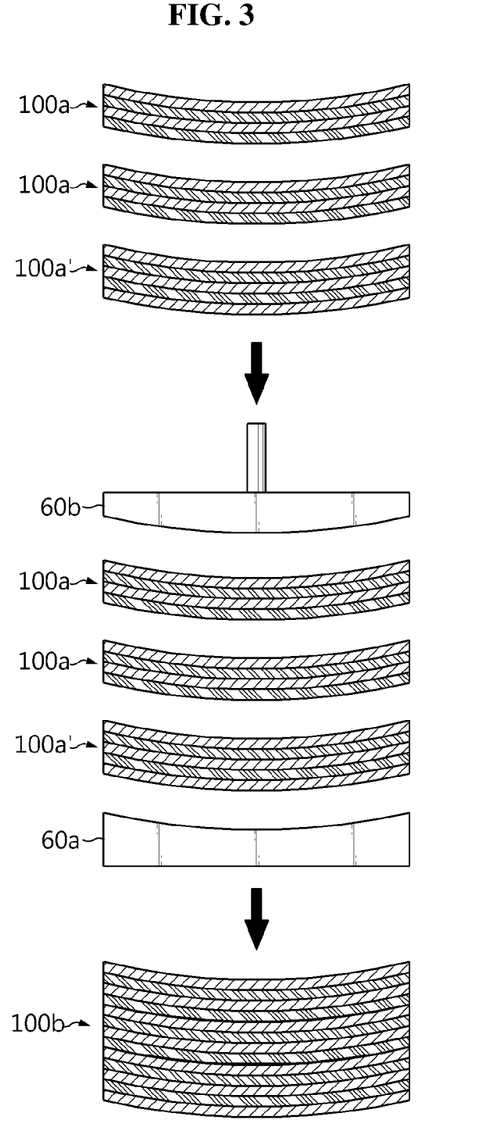
FIG. 3 is an illustration of a process of manufacturing an electrode assembly according to a particular embodiment of the present disclosure.
Figure 4:
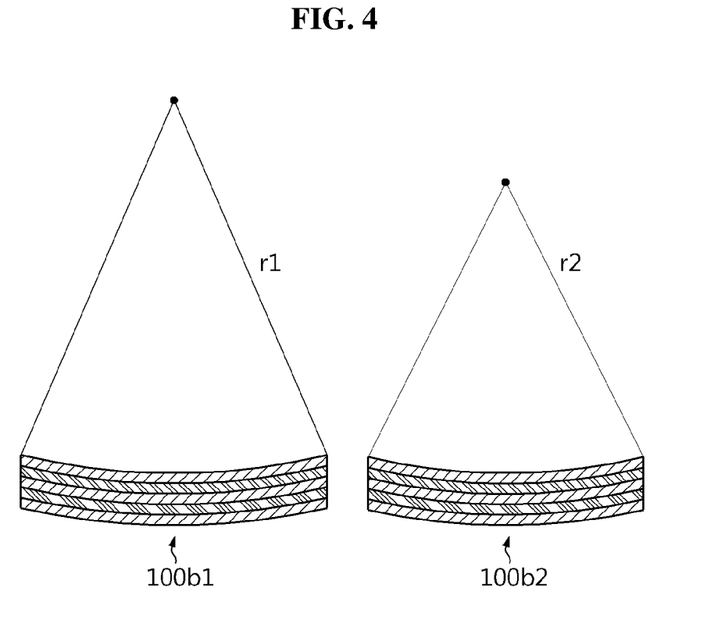
FIG. 4 shows a curvature radius difference between different unit cells.

FIG. 3 is an illustration of the step (S3) for stacking at least two unit cells obtained through the (S2) to manufacture an electrode assembly. Referring to FIG. 3, the (S3) may be performed using a pair of jigs 60a and 60b having a curve. In a particular embodiment of the present disclosure, the jig includes a lower jig 60a on which a plurality of unit cells is seated and configured to support over the unit cells during compression of the unit cells, and an upper jig b configured to press down the unit cells and the lower jig. Also, the lower jig 60a has a concave part with a curvature radius R, and the upper jig 60b has a convex part with a curvature radius R so that it is superimposed on the lower jig 60a. According to a particular embodiment of the present disclosure, the curvature radius R of the jig is equal to the curvature radius R of the unit cells being mounted, or it has a curvature radius R within a predetermined tolerance range for the curvature radius R of the unit cells.

According to a particular embodiment of the present disclosure, the curvature radius R of the jig may be preferably equal to the preset curvature radius R in the (S2'), and an electrode assembly having the preset curvature radius R in (S2') may be completed through the compression process using the jig.

In a particular embodiment, the unit cells do not perfectly match the preset curvature radius R in (S2') and may have other curvature radius R which falls within a predetermined tolerance range. Alternatively, the curvature radii R of the plurality of unit cells being stacked may not perfectly match. Thus, in (S2'), the unit cells may be compressed with the curved jig having the same curvature radius R as the preset curvature radius R to manufacture a curved electrode assembly having a curve formed according to the preset curvature radius R in (S2').

Specifically describing the step (S3) with reference to FIG. 3, first, a plurality of unit cells prepared through (S2) is stacked in a sequential order and mounted on the lower jig 60a. In this instance, the plurality of unit cells may have same or different layer placement. In a particular embodiment of the present disclosure, a unit cell 100a placed higher has a structure of separator/negative electrode/separator/positive electrode, and a unit cell 100a' placed lower has a structure of separator/negative electrode/separator/positive electrode/separator. This is to place the separator at the uppermost and bottommost layers of the electrode assembly. Also, in a particular embodiment, placement of each layer may be appropriately changed according to the final purpose of use of the electrode assembly.

Subsequently, the unit cells 100a and 100a' mounted on the lower jig 60a are pressed by the upper jig 60b to form an electrode assembly 100b.

Preferably, the plurality of unit cells mounted on the lower jig has a same curvature radius R or is included within a predetermined tolerance range. According to a particular embodiment of the present disclosure, the tolerance range is a preset curvature radius R in the step (S2')±10%, 5%, or 3%, and specifically, may be calculated by the following [Equation 1].

$$\text{Tolerance range of curvature radius } (R) = \frac{\text{Preset curvature radius } (R) - \text{Curvature radius } (R) \text{ of unit cell}}{\text{Preset curvature radius } (R)} \times 100 \quad \text{[Equation 1]}$$

In a particular embodiment of the present disclosure, heat treatment may be performed in the pressing process, if necessary, and the heating method is not particularly limited. For example, a heater may be installed within the jig to perform the heating at the same time as the pressing. The pressure and temperature applied during the pressing process is within the range that does cause deterioration of the electrode assembly, preferably the pressure of 150 to 500 kgF and the temperature of 10° C. to 90° C. However, to minimize the deterioration of the electrode assembly caused by the heating, the pressing may be performed at room temperature without any separate heating process.

On the other hand, in a particular embodiment of the present disclosure, in stacking the plurality of curved unit cells to manufacture a curved electrode assembly, a maximum difference in the curvature radius R of the stacked unit cells is preferably within 10%. In other words, among the unit cells, a maximum difference in curvature radius representing a curvature radius difference between a unit cell having a longest curvature radius R1 and a unit cell having a shortest curvature radius R2 is within 10%.

In the present disclosure, the maximum difference in curvature radius is calculated through the following [Equation 2].

$$\text{Maximum difference of curvature radius} = \frac{\text{Longest curvature radius }(R1) - \text{Shortest curvature radius }(R2)}{\text{Longest curvature radius }(R1)} \times 100 \quad [\text{Equation 2}]$$

As described in the foregoing, because the curved electrode assembly according to the present disclosure is manufactured by stacking unit cells formed to have a preset curvature radius R in the roll lamination process, it has very high shape stability of curved shape and a low possibility of shape deformation caused by use of the battery.

Although the present disclosure has been hereinabove described with respect to a limited number of embodiments and drawings, the present disclosure is not limited thereto, and it is apparent to those skilled in the art that various modifications and changes may be made within the technical scope of the present disclosure and the equivalent scope of the appending claims.

DESCRIPTION OF NUMERALS 40a, 40b: Roller
50: Cutter
100a, 100a': Unit cell
100b: Electrode assembly

What is claimed is:

1. A method for manufacturing a curved electrode assembly, comprising:
   (S1) preparing a stack structure comprising at least one negative electrode, at least one positive electrode, and at least one separator, wherein the negative electrode and the positive electrode are stacked with the separator interposed between to electrically isolate the negative electrode from the positive electrode;
   (S2) performing a compression process by which the stack structure is compressed through a pair of compression rollers, to prepare a unit cell having a curved shape; and
   (S3) stacking and compressing at least two unit cells obtained through the step (S2),
   wherein a maximum difference of curvature radius representing a curvature radius difference between a unit cell having a longest curvature radius (R1) and a unit cell having a shortest curvature radius (R2) among the unit cells is within 10%, and
   wherein the longest curvature radius (R1) and the shortest curvature radius (R2) are unequal.

2. The method for manufacturing a curved electrode assembly according to claim 1, wherein the step (S3) is performed using a curved jig, and the jig includes a) a lower jig on which the electrode stack structure is seated and configured to support over the electrode stack structure during thermal compression, and b) an upper jig configured to press down the electrode stack structure, the lower jig and the upper jig having a curvature radius R.

3. The method for manufacturing a curved electrode assembly according to claim 2, wherein the upper jig and the lower jig are bent in a same direction such that the upper jig is superimposed on the lower jig during compression.

4. The method for manufacturing a curved electrode assembly according to claim 1, wherein the step (S3) includes applying a pressure of 150 to 500 kgF by the compression rollers to the at least two unit cells.

5. The method for manufacturing a curved electrode assembly according to claim 4, wherein the step (S3) does not include any heating process.

6. The method for manufacturing a curved electrode assembly according to claim 1, wherein the unit cells are obtained through the step (S2) of controlled temperature, pressure, and/or rollers rotational speed.

7. The method for manufacturing a curved electrode assembly according to claim 1, before performing the step (S2), further comprising:
   (S2') setting roll lamination process condition for the unit cell to have a curved shape.

8. The method for manufacturing a curved electrode assembly according to claim 1, wherein the step (S2) is performed under heating condition.

9. The method for manufacturing a curved electrode assembly according to claim 1, wherein the compression rollers in the step (S2) are provided with a control device to control the set temperature, pressure, and/or rotational speed of the rollers.

10. The method for manufacturing a curved electrode assembly according to claim 1, wherein the compression rollers in the step (S2) are provided with a control device to control the set pressure of the rollers.

11. The method for manufacturing a curved electrode assembly according to claim 1, wherein the compression rollers in the step (S2) are provided with a control device to control the set rotational speed of the rollers.

12. The method for manufacturing a curved electrode assembly according to claim 1, wherein the maximum difference of curvature radius is within 5%.

13. The method for manufacturing a curved electrode assembly according to claim 1, wherein the maximum difference of curvature radius is within 3%.

14. A method for manufacturing a curved electrode assembly, comprising:
   stacking a plurality of unit cells each having a curved shape to manufacture an electrode assembly,
   wherein a maximum difference of curvature radius representing a curvature radius difference between a unit cell having a longest curvature radius (R1) and a unit cell having a shortest curvature radius (R2) among the unit cells is within 10%, and
   wherein the longest curvature radius (R1) and the shortest curvature radius (R2) are unequal.

15. The method for manufacturing a curved electrode assembly according to claim 14, wherein the maximum difference in curvature radius is calculated through the following [Equation 2]:

$$\text{Maximum difference of curvature radius} = \frac{\text{Longest curvature radius }(R1) - \text{Shortest curvature radius }(R2)}{\text{Longest curvature radius }(R1)} \times 100. \quad [\text{Equation 2}]$$

16. The method for manufacturing a curved electrode assembly according to claim 14, wherein each unit cell of the plurality of unit cells is prepared by making the respective unit cell curved by a roll lamination process.

* * * * *